Figure 1:
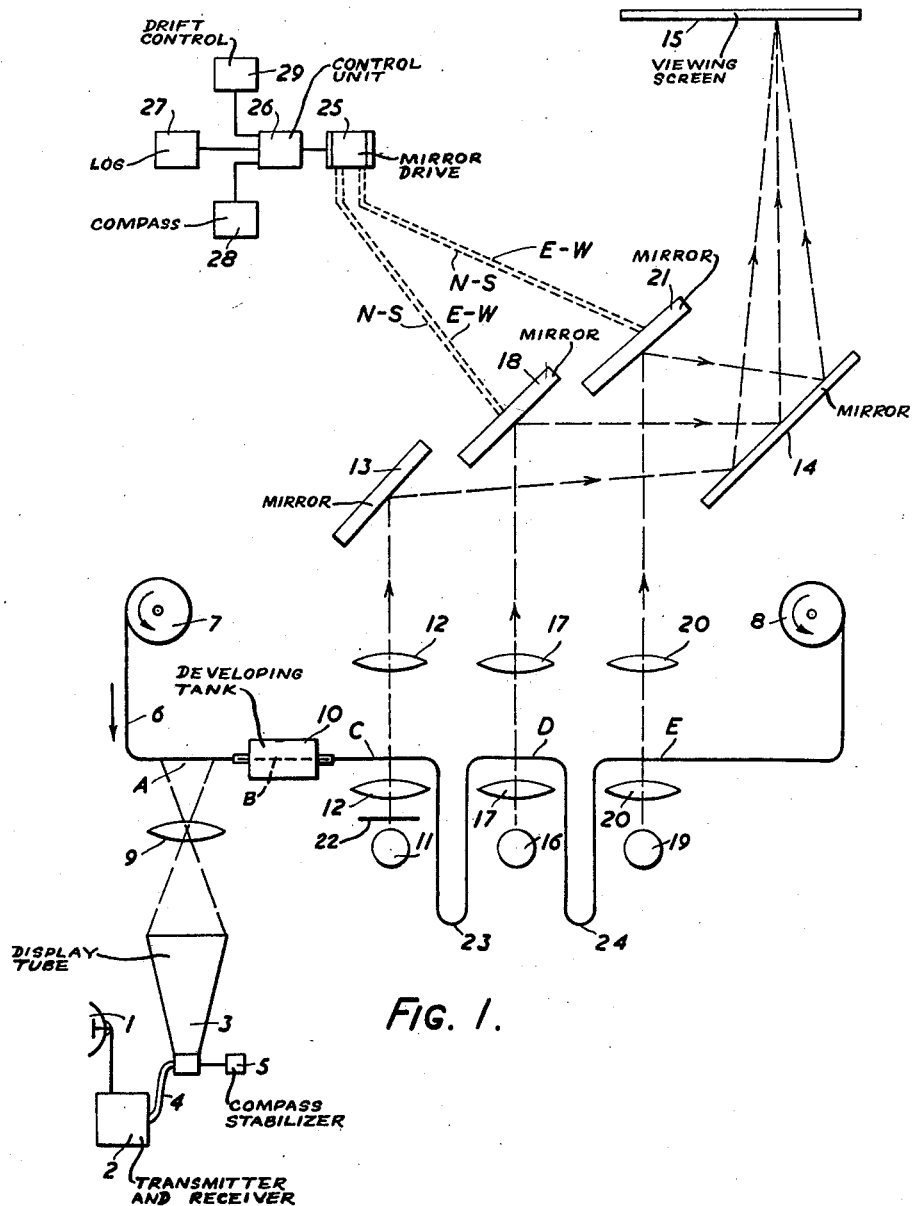

June 22, 1965   J. WATT   3,191,172
SHIP OR THE LIKE MOVEMENT HISTORY RADAR SYSTEMS
Filed July 5, 1962   3 Sheets-Sheet 1

INVENTOR
James Watt
BY Baldwin & Wight
ATTORNEYS

INVENTOR
James Watt
BY Baldwin & Wight
ATTORNEYS

June 22, 1965  J. WATT  3,191,172
SHIP OR THE LIKE MOVEMENT HISTORY RADAR SYSTEMS
Filed July 5, 1962  3 Sheets-Sheet 3

INVENTOR
James Watt
BY
Baldwin & Wight
ATTORNEYS 3,191,172
SHIP OR THE LIKE MOVEMENT HISTORY RADAR SYSTEMS
James Watt, Essex, England, assignor to The Marconi Company Limited, a British company
Filed July 5, 1962, Ser. No. 207,593
Claims priority, application Great Britain, July 10, 1961, 24,875/61
4 Claims. (Cl. 343—11)

This invention relates to movement history radar systems and, though not limited to its application thereto, is primarily intended for marine radar systems. More specifically the invention relates to radar systems of the so-called "true motion" type by which expression is meant a system which provides, or may, when required, be used to provide, a plan-position-indicator (P.P.I.) display in which "own ship" representation is not fixed on the display screen display but appears in different positions at least approximately corresponding to the different positions occupied by the ship in moving. In true motion radar systems as at present known the point of the display representing "own ship" moves across the display in accordance with "own ship" movement so that when the said point reaches or comes near to the edge of the display, the said display has to be "reset." This is a serious defect which, as will be seen later, the present invention avoids. For a strictly accurate true motion display the movement of "own ship" representation across the display should be co-related accurately to the movement of the ship over the sea bottom—which obviously involves taking into account leeway (if any), and tidal and other streams—but although, in certain known radar systems of the true motion type, means are provided for enabling tidal stream and like drift to be taken into account it is also common to ignore such drift and take into account only the ship's movement as measured by her log and compass in relation to the water. The expression "true motion radar system" is employed in this specification, as in common present day practice, to apply to radar systems in which "own ship" representation in the display appears or can be made to appear in different positions corresponding to the different positions resulting from ship's movement whether that movement is truly in relation to the bottom or only in relation to the water.

The problem of designing a marine radar system which will give a watch-keeping officer, reliably and quickly, the information necessary for safe navigation in conditions of heavy traffic and bad visibility has not yet been satisfactorily solved despite the different varieties of P.P.I. displays which have been proposed and used. Safe navigation involves that, before taking any avoiding action, the officer shall know whether danger of collision exists and whether, under the regulations for preventing collisions at sea, it is his duty to take such action. Since, under the regulations, risk of collision is deemed to exit if the compass bearing of an approaching vessel does not appreciably change, the officer must be provided with information of the movements of the ships concerned over the period of time necessary to determine whether or not there is appreciable change of compass bearing and, accordingly, whether it is his duty to maintain his course and speed or to take avoiding action. In the radar systems at present in general use, whether of the true motion type or of the relative motion type—i.e. the common type in which "own ship" representation is always at the centre of the display screen and the representations of coast lines and other fixed objects move in the display in accordance with "own ship" movement—it is sought to satisfy these requirements by presenting the P.P.I. display on a cathode ray tube having a screen with long afterglow effects so that the display shows not only the momentary target positions but also, due to the said afterglow effects, "past history" i.e. previous target positions occupied during the period of afterglow. This dependence on afterglow has serious practical defects. In practice the brightness of the parts of the display actually being "written in" at any time is much greater than the parts which persist by afterglow effects and the latter parts are, in general, too dim for convenient accurate use except (and not alway then) under conditions of almost total ambient darkness. For this and other reasons it is common practice, and, indeed, normally necessary to safe navigation, to resort to manual plotting of observations made of the display screen at intervals and many radar equipments include a so-called "reflection plotter" fitted over the display tube to facilitate such plotting. The need for manual plotting constitutes a serious disadvantage not only because of the fact that it requires skilled manpower, but also because an undesirably long time must elapse before a plot of sufficient length reliably to give the required information can be obtained. Also the number of ships which can be simultaneously plotted by an officer using a simple display as his source of information is, for obvious practical reasons, severely limited, and an officer will, therefore, necessarily confine his attention to those ships constituting the most imminent threats to safe navigation. This can be a serious cause of danger in conditions of heavy traffic. Also, as already stated, in the case (to which the present invention relates) of radar systems of the true motion type such systems, as at present in common use, are so constructed and arranged that "own ship" representation moves towards the screen edge so that it may be necessary to commence plotting another ship when the "own ship" representation is approaching the edge of the display with the result that a plotting operation may have to be stopped or interrupted when the display is reset, or, alternatively, it may become necessary to reset the display before commencing a plot.

Another defect of the usual known radar systems with only a single display tube is that it is impossible, as it is often required to do, to change over quickly from a so-called relative motion display with "past history" in it to a true motion display with "past history" in it, or vice versa because, when the tube is switched over from one display to the other, it takes some time before the new display, with "past history" in it, is built up. Of course, this defect could be avoided by having two tubes in continuous use, one giving a relative motion display and the other a true motion display, but it is obviously not desirable to have two tubes to watch, quite apart from the extra cost involved in providing two tubes with their associated gear, and the considerable danger of the observer drawing wrong conclusions regarding ship movements due to his mistakenly attaching in his mind the relative movement of one ship to the true motion of another.

The present invention seeks to avoid the foregoing difficulties and disadvantages.

According to this invention a radar system comprises means for deriving sets of echo signal information each taken in different azimuth scannings of space, means for storing said sets of information, means for deriving signals substantially representative of movements of said system with time, and means for utilizing sets of stored information, taken in azimuth scannings spaced apart by pre-determined intervals of time and movement representative signals corresponding to movements over the same intervals of time, to provide a P.P.I. display of the true motion type comprising a plurality of component displays with differently positioned origins.

Preferably the movement-representative signals utilized in the production of the display are so utilized that the origin of that component display which is of a set of echo information which is the last taken of the component sets displayed at any time at the centre of the whole display.

Preferably successively taken sets of echo information are stored on a moving record from which they are taken for utilization in the production of the P.P.I. display, by means of recorded signal pick-up devices spaced along the record.

Preferably also the sets of echo information are stored on the moving record through the intermediary of a memory cathode ray tube having a storage target on which received echo signals are stored by a cathode ray scanning said target, and picked off by another cathode ray scanning said target, the picked-off signals being fed to a recording device effective to record the picked-off signals on the moving record. When using a memory tube the scanning speeds and pattern of the two target-scanning cathode rays are so chosen as to reduce the band width of the signals fed to the recording device as compared to that of the signals which are stored in the target.

The moving record may conveniently be an endless tape record with a plurality of associated recorded signal pick-up devices spaced apart along the tape by means of loops therein and preceded, in the direction of tape motion, by an associated recording device in turn preceded by an associated recorded signal wipe-out device.

A system in accordance with this invention may, with considerable practical advantage, be provided with means operable at will, for preventing utilization of the movement-representative signals in the production of the P.P.I. display whereby, while said means are in operation, the display is caused to be a relative motion display instead of a true-motion display, and/or with means, operable at will, for substituting, for utilization of the movement-representative signals in the production of the P.P.I. display, utilization of locally produced signals corresponding to an arbitrarily chosen, adjustable, contemplated course and speed of said system whereby the display is caused to be one which would be obtained if said system adopted said contemplated course and speed.

In one way of carrying out the invention a true motion radar system comprises means for producing on a display surface a component P.P.I. display of echo signals derived in at least one scanning operation of space, at least one additional component P.P.I. display which is of echo signals derived from at least one previous time spaced scanning operation of space, and means for deflecting the origin of said additional component display away from the first mentioned component display by an amount corresponding to the motion of the system between the two scanning operations and in a direction opposite to the direction of said motion.

Preferably there are at least three P.P.I. component displays, each being of signals derived at different spaced times, the component display of the latest derived signals being a P.P.I. display whose origin is undeflected and the other component displays having origins which are displaced with respect to said undeflected origin by amounts corresponding to the motions of the system and in directions opposite to the directions of said motions during the time intervals between the signals displayed in the "latest" component display and the signals displayed in the "earlier" component displays.

It will be seen that the resultant display produced on the display surface is of the true motion type which, however, differs from a true motion display as at present known and in common use in the very important respect that the origin of the latest component P.P.I. display (as will be apparent the words "earlier" and "latest" as applied to component displays are in respect of the times of deriving of the echo signals displayed in said component displays) is at the effective centre of the display surface because its origin is undeflected, the origins of the earlier component displays being deflected back, in accordance with but oppositely to the movements of the system itself during the appropriate times. In this way one of the most serious operating defects of known true motion displays is avoided for there is no question of having to re-set a display in order to prevent it from "coming off the edge" of the display surface.

Preferably the means for moving the origin or origins of the earlier component display or displays back from the origin of the latest display are operable at will by putting the said means out of action, whereby a display of the true motion type can be transformed into a display of the relative motion type.

Preferably the component P.P.I. displays are compass stabilized, e.g. of the "North up" type.

If desired the component displays may be simultaneously present on the display surface and one of them—preferably the latest—may be distinctively colored so as to distinguish it from the others and leave no possible doubt to the viewer as to which is the latest and which is the earliest of the component displays. Alternatively, or as well, the component displays may be cyclically and repetitively produced at relatively high repetition speed in a time order such that each component display is produced a number of times and each is followed, in production, by the next later component display.

The time intervals between the signals displayed by the different component displays may obviously be selected from within a wide range depending on operating requirements but in a practical shipboard installation an interval of the order of 2 or 3 minutes between the signals of one component display and the signals of the next later one will usually be found practical and satisfactory.

In one embodiment of the invention a true motion radar system comprises a display cathode ray tube; means for producing on the screen of said tube a succession of compass stabilized (i.e. "North up") displays, herein referred to as first P.P.I. displays, of radar echo signals derived by scanning space in a succession of scanning operations, each successive first display being a P.P.I. display of echo signals derived in a successive scanning operation and the origin of each of said first displays being at the rest position of the cathode ray in said tube; means including a photographic film and means for advancing the same intermittently with respect to the screen of said tube, for taking photographs of said first displays, the stationary periods of said intermittently advancing film being such that each photograph is of one or of a predetermined small number of successive first displays; means for rapidly developing the photographs taken; a display surface; optical means for projecting on said display surface a plurality of component P.P.I. displays each constituted by the projection of a different one of the developed photographs, the projections being of photographs taken at predetermined spaced time intervals and the projection of the last taken photograph projected at any time being in a predetermined selected position on said surface; and means, included in said optical means, for displaying each projection of an earlier taken photograph in relation to the projection of the last taken photograph by an amount corresponding to and in a direction opposite to the motion of the system during the time interval between the taking of said earlier taken photograph and the taking of the last taken photograph. Preferably the first displays, the photographs and the projected component displays are such that target representations in the said projected component displays appear as bright representations against a dark background.

Preferably the optical means include means for distinctively coloring one of the projections with respect to the others. Alternatively, or as well said optical means may include light sources, one for each of the plurality of projections, which are cyclically and repetitively actuated at a relatively high repetition speed and in a time sequence corresponding to the time sequence of the taking of the photographs which are projected.

The display surface may be a ground glass screen and the optical means may include a plurality of intermediate mirrors, one for each projection, for projecting the component P.P.I. displays on to the viewing screen, means being provided for altering the inclinations of said intermediate mirrors in dependence on the movements of the system.

The photographic film may conveniently be of the cinematograph type and be advanced intermittently, one frame at a time, past the screen of the cathode ray tube, said film, after passing said screen, moving through a developing and fixing tank and thence in succession past the optical projection points, the said film being looped in loops each a predetermined number of frames long, between each successive pair of projection points.

The apparatus required in carrying out this invention, to produce a given quality of display, is relatively simple and by no means prohibitive in cost to produce a fresh component P.P.I. display every 10 seconds in a true motion display comprising three component displays covering a total time of say 4 or 6 minutes. Moreover the invention lends itself to the production of bright clear displays which can be viewed in ordinary daylight without the use of ambient light excluding shields.

The invention is illustrated schematically in the accompanying drawings.

Figure 2:
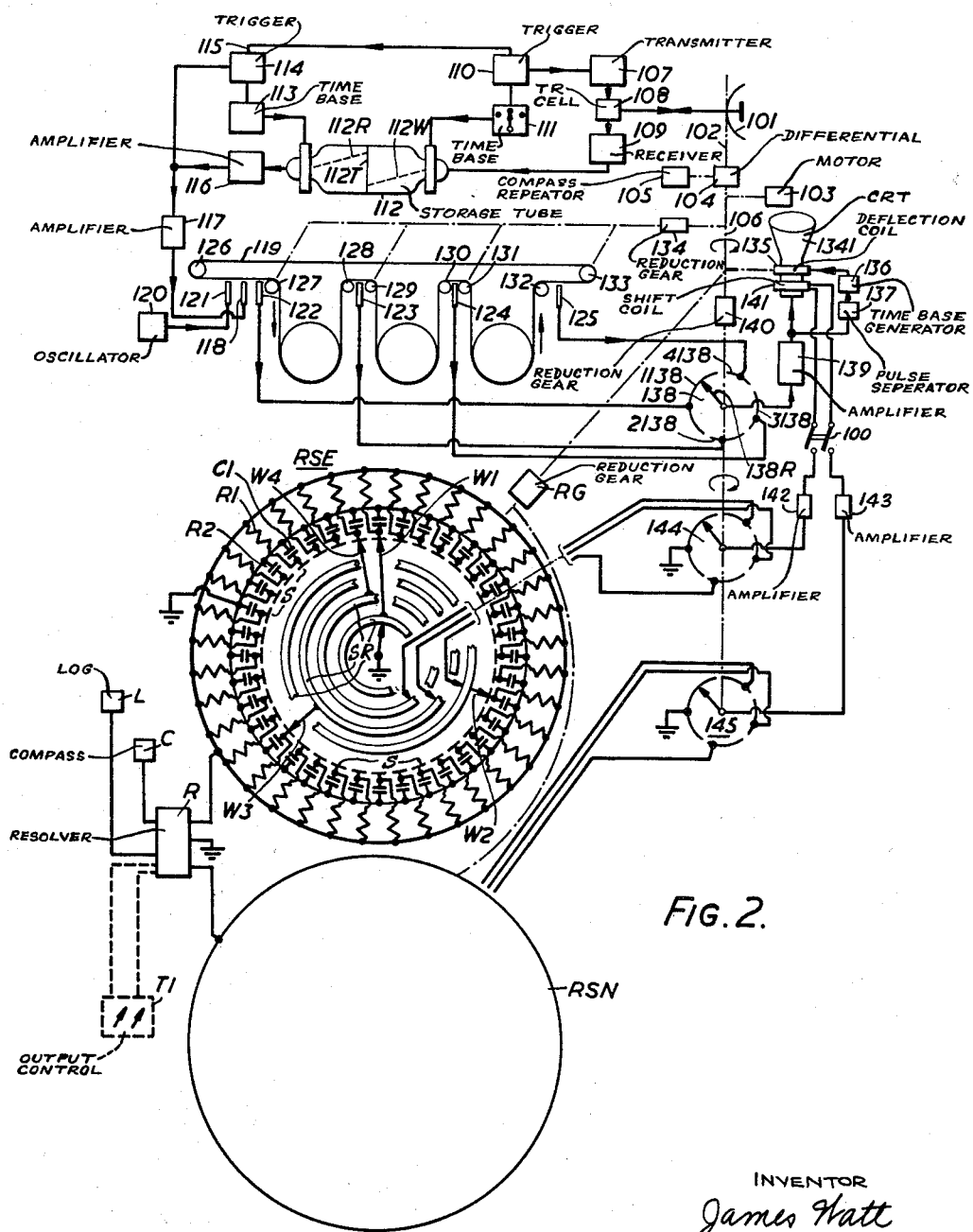
Figure 3:
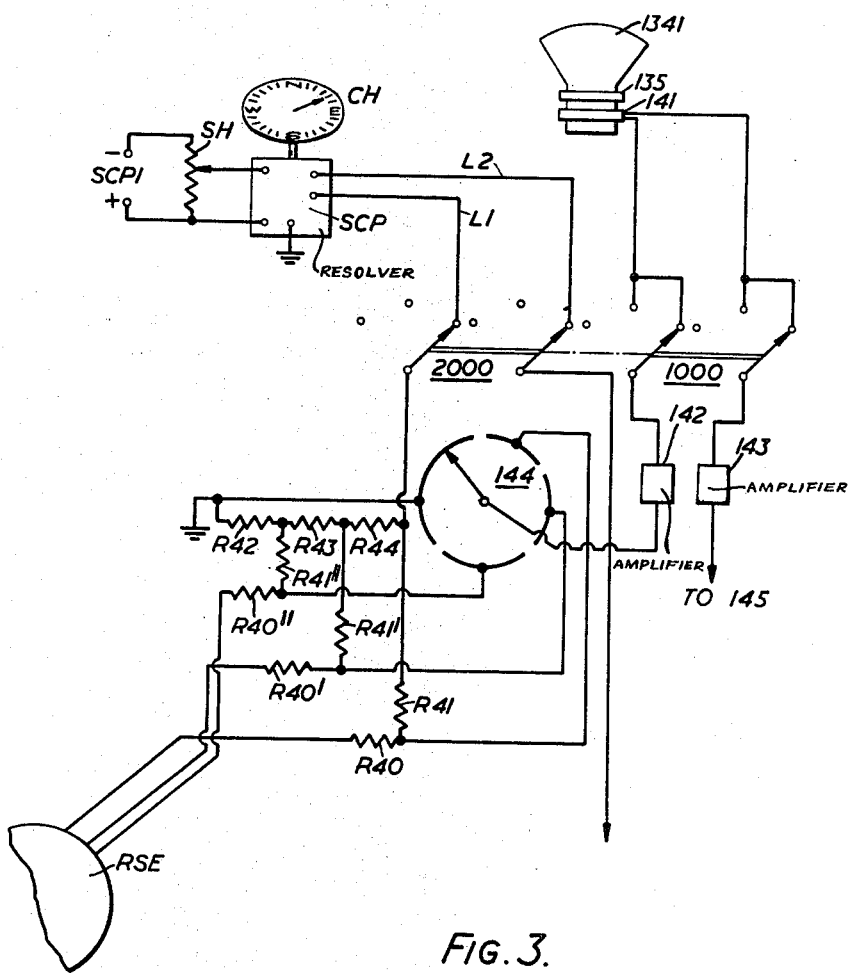

In these drawings, FIGURE 1 shows, so far as is necessary to an understanding thereof, one form of marine radar in accordance with the invention, FIGURE 2 shows a preferred modification, and FIGURE 3 is a part view, showing, as far as is necessary to an understanding thereof, modifications and additions which may be made to the embodiment of FIGURE 2 to provide valuable additional information for a navigating officer.

Referring to the FIGURE 1, 1 represents a radar scanning aerial which is rotated in azimuth in the usual way and is connected to an ordinary known radar equipment 2 incorporating a transmitter, an echo signal receiver, and cathode ray tube deflection means for a cathode ray display tube 3 indicated as connected to the equipment 2 through cabling 4. The equipment as so far described is in accordance with well-known practice and needs no further description. It is arranged to produce a relative motion P.P.I display on the screen of the tube 3 with "own ship" representation in the middle of the screen. Preferably to display is compass stabilized "North up," also in a well known way, the block 5 representing a compass controlled unit 5 for compass stabilization of the display.

A cinematograph film 6 is intermittently driven by means (not shown) from a storage reel 7 on to a wind-on reel 8. In this passage from one reel to the other the film passes through five positions indicated by the references A, B, C, D and E of which positions A, C, D and E occupy each one film frame and position B may occupy one or more film frames. A film frame in position A has projected thereon, by means of a suitable lens system represented by the lens 9, an image of the P.P.I display on the screen of the tube 3. A frame or frames in position B is or are subjected to photographic processing by any convenient known high speed film processing arrangement represented by the tank 10. Preferably the processing is of the reversal type such that echo signals on the processed film are in the form of transparent areas in a generally opaque background. A frame in position C is imaged by means of a light source 11, lens system 12, inclined mirror 13, and inclined mirror 14 on to a ground glass, paper or other viewing screen 15. A frame in position D is imaged by means of a light source 16, lens system 17, inclined mirror 18 and the aforesaid inclined mirror 14 on to the viewing screen 15. A frame in position E is imaged by means of a light source 19, lens system 20, inclined mirror 21 and the aforesaid mirror 14 on to the viewing screen 15. A distinctively colored filter, for example of red glass 22, is interposed in the light path through position C to the viewing screen 15.

Between positions C and D and also between positions D and E are two loops 23 and 24 of film, each of predetermined length, for example each 12 frames long. The film is intermittently advanced in the direction of the arrow, one frame at a time, by film advancing mechanism (not shown) of the cinematograph type. The drive to the film is applied at a number of points so chosen as to ensure that film frames are simultaneously in positions A, B, C, D and E, remain there for a predetermined period of time, for example for approximately 10 seconds, and are then advanced, as nearly instantaneously as possible, by one frame. During each such rest period of approximately 10 seconds, a frame in position A is exposed to a short succession of complete scans on the screen of the tube 3. The movement of target indications on the screen during each such period may be regarded as practically negligible. At any instant when the film is at rest there will be one frame, in position A, taking a photograph of the display on the screen of tube 3; another frame in position C having on it a photograph of a display which may, for practical purposes be regarded as substantially the same as that being produced at the moment on the screen of the tube 3 because the time taken for processing the film in position B can be made very short—only about 20 seconds in practice; another frame in position D, having on it a photograph taken approximately two minutes earlier (assuming 12 frames in the loop 23); and a frame in position E having on it a photograph taken two minutes earlier still (assuming 12 frames in the loop 24).

The mirror 13 is fixed and the mirrors 18 and 21 have datum positions from which they can be tilted in coordinate perpendicular directions as will be described later. When the mirrors 18 and 21 are in their datum positions the projected three pictures from the frames in positions C, D and E respectively are superimposed on the common viewing screen 15 with the origins of all three displays coincident. The resultant display seen on the screen 15 will therefore be a relative motion display composed of three component P.P.I displays, namely the latest (from position C) which will be up to date if one neglects the short time taken in position B, and two earlier component displays (from positions D and E respectively) which are two minutes and four minutes earlier, respectively.

As above stated, each of the mirrors 18 and 21 can be tilted in either or both of two mutually perpendicular co-ordinate directions. These co-ordinate directions of tilting are such as to produce shifts in the N-S and E-W directions of the appropriate pictures projected on to the screen 15. The co-ordinate tilting is produced by any convenient resolving and driving mechanisms known per se and jointly controlled by the ship's log and by the ship's compass, these mechanisms being arranged to resolve ship's movement, as measured by the log and compass, into N-S and E-W components and to tilt the mirrors 18 and 21 in accordance therewith. The whole arrangement is such that the mirror 18 deflects the origin of the picture projected by that mirror on to the viewing screen 15 to a position which is spaced from the position of the origin of the picture projected by the mirror 13 by an amount representative of the movement of the ship through the water during the two minutes which elapses during the movement of a cinematograph frame from position C to position D and in a direction opposite to the direction of the ship's movement through the water in the said two minutes. Similarly, the origin of the picture projected via the mirror 21 is deflected back in relation to the origin of the picture projected by the mirror 13 by an amount representative of the amount of ship's movement in four minutes and in a direction opposite to the direction of that movement. When these tilting drives are applied to the mirrors 18 and 21—and the drives are arranged to be switched in or out as required—the display on the screen 15 is transformed into a true motion display in which, however, the latest component display—colored red in the example illustrated— always has its origin at the centre of the viewing mirror. The means for resolving ship's movement into N–S and E–W components are known per se so that it is sufficient to indicate the tilting arrangements for the mirrors 18 and 21 purely schematically. The mechanical drives are indicated by broken lines referenced N–S and E–W and are obtained from a mechanical driving unit 25 controlled by a control unit 26 in turn receiving a controlling input from a ship's log unit 27 and a ship's compass unit 28. With the equipment as so far described the ship's motion taken into account will be merely the ship's motion relative to the water as measured by log and compass. In many cases this will be sufficient. If it is desired in any case to include in the motion taken into account the motion of the water itself, an added control input to the unit 26 may be provided, as known per se, from a further manually adjustable control unit 29 arranged to provide added control adjusted to accord with estimated tidal or other stream drift. By cutting in or out the tilting drives to the mirrors 18 and 21 the display may be changed over at will from a true motion to a relative motion and vice versa. Instead of or as well as providing the colored filter 22 (which removes any possible doubt as to which is the latest of the component P.P.I. displays seen on the screen 15) the lamps 11, 16 and 19 may be arranged not to be left on continuously (as assumed in the preceding description) but to be switched on repeatedly and cyclically at a comparative fast repetition cycle in the lamp order 19–16–11.

The periods of approximately 10 seconds and 2 and 4 minutes mentioned above are given by way of example only and may be varied within wide limits. In a multi-range system it may be convenient to arrange to alter either or both of these time periods in dependence upon range changing by the same control handle which effects change-over.

The embodiment diagrammatically represented in FIG-URE 2 will produce at will either a speeded-up display of relative motion with past history in it or a speeded-up display of true motion with past history in it, the type of display obtained depending on the position of the switch 100 which is open for relative motion and closed for true motion. In describing FIGURE 2 certain numerical values will be given but it is to be understood that these are by way of example only and in no sense limiting. In FIGURE 2 mechanical drives are represented by chain lines.

Referring to FIGURE 2 the usual scanning radar aerial 101 is rotated in azimuth by a shaft 102 in turn driven by an electric motor 103 through a differential 104 whose record drive input is from a compass repeater motor 105. The shaft 106 is rotated by the motor at a constant speed of 30 r.p.m., the aerial 101 rotating at 30 r.p.m. relative to true North and the shaft 106 rotating at 30 r.p.m. relative to ship's head. The radar equipment comprises the usual transmitter 107, transmit-receive cell 108 and receiver 109. The transmitter 107 is triggered at a pulse repetition frequency of 1000 c./s. by a trigger unit 110 which also triggers the writing time base 111 of a "memory" cathode ray tube 112 of known form having a storage target 112T consisting of a linear array of storage elements, a "writing" beam 112W which scans across the array and "writes" signal-representative electrical charges on the target while doing so and a "reading" beam 112R which scans across the array to produce output signals in accordance with the stored charges. The "writing" beam is caused to scan across the array elements each time a pulse is transmitted during a period suitable for the range of the display required and, in the illustrated embodiment, the arrow on the block 111 represents a range changing switch whereby any of a number of different periods, each corresponding to a different range, can be selected. If, for example, a range of 10 miles is required, the writing beam would scan the array in (approximately) the first 120 μsecs. of the 1000 μsec. interval between successive pulses. The writing beam is, of course, modulated by signals from the receiver 109. The "reading" beam 112R is similarly scanned across the array of storage elements by a saw-tooth wave from a "reading" time base 113 triggered by a trigger unit 114. A suitable pulse repetition frequency for the trigger unit 114, which is preferably though not necessarily phase locked as indicated by lead 115 with the unit 110 is 500 c./s. This gives a time of 2000 μsec. available for each "reading" scan. Only 1600 μsec. of this is utilized for the scanning excursion proper, leaving 400 μsec. for fly-back time.

The use of the "memory" tube 112 in effect compresses the video band width from the receiver 109 by the ratio of the writing and reading beam spot velocities i.e. at a one mile range by a ratio of 133:1, and at a 50 mile range by a ratio of 2.7:1. The number of individual elements in the linear storage array is sufficient to enable the array to store 200 separate bits of information. For a reading scan completed in 1600 microseconds the bits of information are taken off at the rate of 125,000 per second. The band compressed output signals from the tube 112 are amplified by a video amplifier 116 and, as will now be seen a band width of up to 125 kc./s. for this amplifier and subsequent parts of the display equipment is adequate.

Amplified output from the amplifier 116 and synchronizing signals at 500 c./s. from the trigger unit 114 are of opposite polarity and are fed to a recording amplifier 117 and fed to a magnetic recording head 118 magnetically recording on an endless loop of magnetic recording tape element 119. This tape is driven in the direction of the arrow. It passes first over an erasing head 121 fed from an erasing oscillator 120 and then over a succession of four pick-up heads 122, 123, 124, 125. The magnetic tape has sprocket holes (not shown) and is driven over sprocket wheels 126 to 133 inclusive at a constant speed of 8 ft./sec., the sprocket wheels 127, 129, 131 and 133 being driven via a 10 to 1 reduction gear box 134 from the shaft 106. The successive heads 122, 123, 124 and 125 are spaced apart by lengths of tape corresponding each to precisely 60 revolutions of the aerial in azimuth relative to true north. There are therefore available from these heads at any time, video signals corresponding to echoes received from a radar pulse emitted on the particular compass bearing on which the scanning aerial lies at this time (delayed only by the negligible time taken for the tape to travel from heads 118 to 122) and at substantially 2 minutes, 4 minutes and 6 minutes previously.

A cathode ray tube 134I has a rotating deflection coil 135 driven from the shaft 106 to produce a P.P.I. type of scan rotating on the screen of the tube in continuous agreement with the true bearings of the aerial. This coil 135 is fed with a suitable saw tooth wave from the display time base generator 136 which is triggered by synchronizing pulses separated by a synchronizing pulse separator 137.

In order that the commencement of each radial scan on the display tube 134I shall be correctly timed, the reading trigger generator 114 feeds a synchronizing pulse timed with the commencement of each reading scan into the recording amplifier 116 together with, but in opposite polarity to, the echo signals of the associated reading cycle.

The signals from the four pick-up heads are fed via a distributor switch 138 to a video amplifier 139 the output from which is fed to modulate the beam in the tube 134I, the synchronizing signals in that output being separated by unit 137 to trigger unit 136. The normal arrangement will be for the video signals in the output from amplifier 139 to be positive going and the synchronizing signals at this point to be negative going.

In order to produce the effect of repeating accelerated motion on the final display screen of tube 134I the signals from the four pick-up heads are cyclically selected by the switch 138 for application individually to the input terminal of the amplifier 139. The rotor 138R of the switch is driven at 6 r.p.m. via a 5:1 reduction gear box 140 from the shaft 106. The switch stator contacts 1138, 2138, 3138 and 4138 connected respectively to pick-up heads 122, 123, 124 and 125 respectively subtend angles a trifle less than 144°, 72°, 72° and 72°, the whole arrangement being such that the recorded sets of information derived 6, 4, 2, and substantially zero minutes ago are displayed cyclically on the tube 1341 for one revolution of the P.P.I. scan, one revolution, one revolution and two revolutions respectively in this order, and repeating.

The equipment as so far described will produce a relative motion display. To provide a true motion display the apparatus now to be described is added. The display tube 1341 is provided with a shift coil unit 141 consisting of two mutually perpendicular shift coils (not separately shown) one producing a shift in the meridional (i.e. N–S) direction and the other a shift in the latitude parallel (i.e. E–W) direction. These coils are fed with D.C. shift voltages from two D.C. amplifiers 142 and 143. Amplifier 142 which provides the meridional shift component is fed from the rotor of a distributor switch 144 and amplifier 143 is fed similarly from a similar switch 145. The amplifiers 142 and 143 are connected to their respective coils in the coil unit 141 whenever a true motion display is required by closing the switch 100. When this switch is open a relative motion display is given. The switches 144 and 145 are similar to the switch 138 and are driven synchronously therewith by the same shaft.

E–W and N–S components of ship's motion are inserted through the medium of the switches 144 and 145 respectively by apparatus now to be described. This apparatus includes a log driven electrical unit L of any form known per se and providing an output representative of ship's speed through the water; a compass driven electrical unit C of any form known per se and providing an output representative of ship's compass course; a resolver R; and two rotary switch units generally designated RSN and RSE which are similar but only one of which is shown in detail, the other being represented by a plain circle. If desired means, also as known per se and represented by the broken line block T1 may be provided for producing manually adjustable outputs representative respectively of tidal or current direction and speed and the corresponding leeway quantities. The units L, C, R and T1 are only schematically represented since they may all be in accordance with well known practice. The units L and C (and if provided and in use, the unit T1) feed their outputs into the resolver R which provides therefrom, in known manner, two outputs of which one is a voltage analogue of the E or W component of ship's speed and the other is a voltage analogue of the N or S component thereof. One of these outputs goes to switch unit RSE and the other to switch unit RSN. Only one of these (RSE) will be described, the other RSN being similar.

The switch unit RSE has, in the case illustrated, 36 resistance-capacity integrators each comprising a resistance and an associated condenser. In order to reduce the number of references only one integrator R1–C1 is referenced. These integrators are fed in parallel with the E–W component output from the resolver R. Each of the condensers is connected on one side to a different one of the 36 segments of a rotary switch having rotary contacts which are rotated at 1/180 of the speed of rotation of the shaft 106 through a 180/1 reduction gear box RG driven by said shaft. In the example now being described the rotary contacts will accordingly revolve at 1 revolution in 6 minutes approximately. The switch RSE has four wipers W1, W2, W3 and W4 respectively contacting four continuous slip rings SR. These slip rings SR are shown with portions broken away merely as a draftsman's expedient for more clearly illustrating the respective connections between the four wipers and the four slip rings, but, as stated above, each slip ring SR is actually continuous. The wiper W1 is connected via the innermost slip ring to earth so that, as it rotates it will discharge the integrator condensers to earth in turn one every 6 minutes (approx.). The three other wipers W2, W3, W4, are spaced at 120° (corresponding to two minutes of rotation), W2 following W1 in rotation by just less than 2 minutes, W3 following W2 by 2 minutes, W4 following W3 by 2 minutes, and W4 preceding W1 by an amount corresponding to the interval between two adjacent ones of the segments S to which the condensers are connected, i.e. 10° corresponding to 10 secs. After it has been discharged each condenser builds up a charge corresponding to the integration of the instantaneous E–W component of ship's speed and therefore corresponding to the component distance run. Accordingly the voltages picked off by wipers W2, W3 and W4 will be voltage analogues of component distances in the preceding 2, 4 and 6 minutes respectively. The voltages are fed for distribution to three of the four segments of switch 144 (the fourth segment is earthed) as shown.

Voltage analogues of N–S component distances are similarly derived by switch unit RSN and fed to switch 145.

In the arrangement illustrated each of the wipers W2, W3 and W4 remains for 10 seconds on a different one of the 36 fixed segments S and in this time the aerial 101 rotates 5 times giving 5 sets of radar information. Ideally the number of integrators and fixed contacts should be increased 5 times in order that the information on ship's motion at switches 144 and 145 would be always up-to-date with respect to the radar information. However, the arrangement shown is considered adequate for practical purposes in that the correction of ship's motion information every 10 seconds, instead of every 2 seconds, is, from the practical point of view, sufficient.

It is apparent that the purpose of the slip rings is to allow contact to be made respectively to earth and to the three inputs to the switch 144. These three inputs are taken in phase relationship around the switch of 120°, as shown by the arrow contacts. As the switch rotates at its given constant sweep each R.C. integrator is successively earthed and then the instantaneous potential of each integrator is picked off by the appropriate contacts connected to the switch 144. Since a voltage proportional to the movement of the vessel is applied to the outer ring conductor of the switch, the integrators will commence to charge up to this voltage immediately after they are released from earth. The state of charge of each integrator will depend upon the time since it was earthed and the voltage applied from the resolver R. The integrators are allowed to charge for six minutes each. The individual integrators store instantaneous voltages proportional to the sum of the incremental distance moved by the vessel in the directional component concerned since last the integrator was earthed.

In a modification (not illustrated) the 5/1 gear box 140 is replaced by a step-up 200/1 gear box and the switches 138, 144 and 145 are replaced by electrical switches arranged to remain on each play-back head for one radial scan in the tube 1341 instead of, as in the illustrated embodiment, for one complete azimuth scan. With such a modification the complete displayed track, showing relative or true motion, and consisting of 4 steps per target, would appear continuous to the eyes instead of appearing as a stepped track. In practice, however, the illustrated embodiment is preferred.

In yet another modification (also not illustrated) the first play back head 122 is eliminated and the radar signals corresponding to zero time are derived from the input terminal of the recording amplifier 117 the length of the tape loops being, of course, measured in this case from the position of the recording head 118.

In the embodiment of FIG. 2 (and its two modifications) the switch 100 is a two position switch which, when moved to one position (open) gives a speeded-up relative motion display covering the last 6 minutes showing motions of other ships relative to own ship with spurious effects of yawing and the like of own ship taken out by compass stabilization. In the other position (closed) of switch 100, a speeded up true motion display with the latest "paint" of own ship always at the centre of the display screen and such that relative tracks can be established by direct plotting on a reflection plotter, is obtained. With switch 100 in its second or closed position component ship's motion deflection shifts are applied to the successively displayed radar pictures in such manner that, as any set of four consecutive pictures are displayed, stationary targets appear in the same positions on the final display screen and moving targets step along from scan to scan giving a 60/1 speeded up display of other ship's true motions over the last 6 minutes with own ship's position central in the display. If, however, there were added to the aforesaid component ship's motion deflection shifts another set of component shifts corresponding to a different contemplated ship's course and speed—e.g. one intended to be adopted to avoid collision—the new shifts being applied in the appropriate sense—the effect would be to produce a speeded-up display of what would have been the relative motions of all ships if own ship had been proceeding for the last 6 minutes on the contemplated course and speed. This would be of great advantage to the navigating officer for it would permit him to see the effect on the relative tracks of other ships, and therefore on their nearest approach, of making the contemplated alteration of course and speed before the alteration is actually made.

FIG. 3 shows modifications which, if made to the embodiment of FIG. 2, will provide this valuable added facility. Parts not shown in or described in connection with FIG. 3 are as in FIG. 2.

Referring to FIG. 3 the two position double pole switch 100 is replaced by a three position double pole switch 1000 having two positions corresponding to those of switch 100 and a third position, the right hand one, in which the new display, based on contemplated course, is given. There is also a second three-position double pole switch 2000 ganged with switch 1000 to form a simple three position switch unit. The part of this unit constituted by switch 1000 has its two right hand contacts (one in each pole) connected to the two middle contacts, this switch being otherwise as in FIG. 2 and being connected in the same way to switches 144 and 145 of which only the former is shown in FIG. 3. SCP is a resolver, such as a sine-cosine potentiometer unit into which a negative adjustable by a potentiometer SCP1 is fed and which will provide two outputs, one on lead L1 and the other on lead L2, corresponding one to the N–S speed component and the other to the E–W speed component of a contemplated course at which the course handle CH has been set, at a speed to which the contemplated speed handle SH, which is the slider of the potenjiometer SCP1, has set. The speed scale (not shown) on the potentiometer is so marked and the associated potential source is of such polarity that the voltage input to the resolver SCP is —2 times the voltage analogue of the contemplated new speed and the outputs on leads L1 and L2 are —2 times the voltage analogue of the N–S and E–W components of distance run in 6 minutes at the contemplated course and speed set respectively on the handles CH and SH. Lead L1 is connected, when switch 2000 is in its right hand position, through resistances R44, R43 and R42 in series to the earthed segment of switch 144 and through resistance R41 to what may be termed the "6 minute" segment of this switch which segment is also connected through resistance R40 to what may be termed the "6 minute" output lead of switch unit RSE which is only schematically indicated in FIG. 3 since it is as in FIG. 2. The junction of resistances R44 and R43 is similarly taken through resistance R41' to the "4 minute" segment of switch 144 and through resistance R40' to the "4 minute" output lead of switch unit RSE. The junction of resistances R43 and R42 is similarly taken through resistance R41" to the "2 minute" output segment of switch 144 and through resistance R40" to the "2 minute" output lead of switch unit RSE. The other output from resolver SCP is similarly connected via the right hand pole of switch 2000, when in its right hand position, to a resistance network similarly associated with the leads between switch unit RSN (see FIG. 2) and switch 145. Since these connections and arrangements are the counterpart of those above described, they are not shown in FIG. 3 from which switch 145 and switch unit RSN are, in the interests of clear drawing, omitted.

Resistances R40, R40', R40", R41, R41' and R41" are equal high resistances, and R44, R43 and R42 are equal low resistances, constituting a potentiometer to equally spaced different points on which the resistances R41, R41' and R41" are returned. As will be apparent, the equal high resistance pairs such as R40 and R41 allow the voltage existing at the appropriate point (the highest voltage end in the case of the pair R40, R41) on the potential divider to be added to the output voltage on the appropriate lead (in this case the "6 minute" lead) from switch unit RSE, half the sum of these voltages being fed to the appropriate segment (in this case the "6 minute" segment) of switch 144.

The following effects are true of the display of each set of four consecutive radar "scenes" each set being considered separately:

When the switch unit comprising switches 1000 and 2000 is in either of its two left hand positions, the equipment operates as already described in connection with FIG. 2; when, however, the third, or right hand, position is adopted, the effects of own ship's real motion are removed from the display and there are substituted therefor the effects of the contemplated course and speed, producing a display such as would be obtained if own ship were on that course and speed. It will be seen that the true motion is not effective on the display of that which is, at any time, the latest "scene", stationary targets therein appearing to drift slowly astern at their normal scalar relative speed. With the switch in its third position the navigating officer is able, quickly and easily, to see if a contemplated course is safe and satisfactory and/or by trial and error with the control CH and SH, to select a course and speed that is.

The arrangement shown in FIG. 3 provides signals which, when added to the signals which appear from the switch arrangements RSE and RSN, have the effect of producing deflection signals at the tube 1341 which would be produced if the vessel had been progressing for the last six minutes on the course contemplated. The contemplated course is set on the manual resolver, and the voltages obtained from the manual resolver are applied in the correct sense to the segments of the switch 144. Thus, for example, if the proposed action is to bring the vessel to a halt, the voltages derived from the resolver would be twice the voltages which appear as a result of the actual movement over the last six minutes (this being determined by observation by the operator), and these double voltage signals would be applied through the voltage divider network which would reduce their value to half and apply them in opposition to the voltages from the switch arrangement RSE. Thus, the voltages applied to the tube would all be reduced to zero and the effect on the display would be as if the vessel had been stationary for six minutes. Various other alternative courses can be envisaged.

I claim:

1. a radar system comprising means for deriving sets of echo signal information taken in different azimuth scannings of space spaced apart by predetermined intervals of time; a memory cathode ray tube connected to said means for driving sets of echo signal information, said memory cathode ray tube having a storage target on which received sets of echo signal information are stored by a cathode ray scanning said target and are picked off by another cathode ray scanning said target; means for storing said sets of echo signal information including a moving recording element which is an endless tape having loops therein, a recording device effective to record said picked-off sets of echo signal information onto said endless tape, and a record signal wipe-out device preceding said recording device in the direction of tape motion; means for feeding the picked-off sets of echo signal information to said recording device; means for deriving signals substantially representative of movements of said radar system with time; recorded signal pick-up dev'ces spaced apart along said tape by means of the said loops therein and preceded, in the direction of tape motion, by said recording device; and means for utilizing the recorded signals picked up by said pick-up devices and said movement-representative signals to provide a P.P.I. display of the true motion type comprising a plurality of component displays with differently positioned origins.

2. A radar system comprising means for deriving sets of echo signal information taken in different azimuth scannings of space spaced apart by predetermined intervals of time; means including a moving recording element for storing said sets of information; means for deriving signals substantially representative of movements of said radar system with time; recorded signal pick-up devices spaced along said recording element; means for utilizing the recorded signals picked up by said pick-up devices and said movement-representative signals to provide a P.P.I. display of the true motion type comprising a plurality of component displays with differently positioned origins; and means, operable at will, for substituting, for the movement-representative signals in the production of the aforesaid P.P.I. display, locally produced signals corresponding to an arbitrarily chosen, adjustable, contemplated course and speed of said radar system whereby the P.P.I. display is caused to be one which would be obtained if said radar system adopted said contemplated course and speed.

3. A radar system comprising means for deriving sets of echo signal information taken in different azimuth scannings of space spaced apart by predetermined intervals of time; means including a moving recording element for storing said sets of information; means for deriving signals substantially representative of movements of said radar system with time; recorded signal pick-up devices spaced along said record element; and means for utilizing the recorded signals picked up by said pick-up devices and said movement-representative signals to provide a P.P.I. display of the true motion type comprising a plurality of component displays with differently positioned origins, the said component displays being cyclically and repetitively produced at relatively high repetition speed in a time order such that each component display is produced a number of times and each is followed, in production, by the next later component display.

4. In a radar system, a display cathode ray tube; means for producing a succession of first P.P.I. compass stabilized displays of radar echo signals derived by scanning space in a succession of scanning operations, each successive first display being a P.P.I. display of echo signals derived in a successive scanning operation and the origin of each of said first displays being at the rest position of the cathode ray in said tube; means including a photographic film and means for advancing the same intermittently with respect to the screen of said tube, for taking photographs of said first displays, the stationary periods of said intermittently advancing film being such that each photograph is of one of the successive first displays; means for rapidly developing the photographs taken; a display surface comprising a ground glass screen; optical means for projecting on said display surface a plurality of component P.P.I. displays each constituted by the projection of a different one of the developed photographs, the projections being of photographs taken at predetermined spaced time intervals and the projection of the last taken photograph projected at any time being in a predetermined selected position on said display surface; and projection displacing means, included in said optical means, for displacing each projection of an earlier taken photograph in relation to the projection of the last taken photograph by an amount corresponding to and in a direction opposite to the movements of the radar system during the time interval between the taking of said earlier taken photograph and the taking of the last taken photograph, said projection displacing means comprising a plurality of intermediate mirrors, one for each projection, for projecting the component P.P.I. displays on to the display surface and means for altering the inclinations of said intermediate mirrors in dependence on the movements of the radar system; the first displays, the photographs and the projected component P.P.I. displays being such that target representations in the said projected component P.P.I. displays appear as bright representations against a dark background.

References Cited by the Examiner

UNITED STATES PATENTS

| | | |
|---|---|---|
| 3,080,556 | 3/63 | Breithaupt. |
| 3,090,043 | 5/63 | Wilkenson. |

FOREIGN PATENTS

| | | |
|---|---|---|
| 838,256 | 6/60 | Great Britain. |
| 863,648 | 3/61 | Great Britain. |
| 882,905 | 11/61 | Great Britain. |

C. L. JUSTUS, *Primary Examiner.*